(12) United States Patent
Smith et al.

(10) Patent No.: US 6,314,861 B1
(45) Date of Patent: Nov. 13, 2001

(54) HIGH OUTPUT SPRING BRAKE ACTUATOR

(75) Inventors: Teddy D. Smith; Michael D. Stubblefield, both of Fresno, CA (US)

(73) Assignee: TSE Brakes, Inc., Fresno, CA (US)

( * ) Notice: Subject to any disclaimer, the term of this patent is extended or adjusted under 35 U.S.C. 154(b) by 0 days.

(21) Appl. No.: 09/336,867

(22) Filed: Jun. 18, 1999

(51) Int. Cl.$^7$ ........................................ F01B 7/00
(52) U.S. Cl. .............................. 92/62; 92/130 A
(58) Field of Search ..................... 92/62, 130 A

(56) References Cited

U.S. PATENT DOCUMENTS

| | | |
|---|---|---|
| 2,950,739 | 8/1960 | Lofink . |
| 3,372,623 * | 3/1968 | Wearden et al. ................... 92/63 |
| 3,625,117 * | 12/1971 | Tazelaar ..................... 92/130 A X |
| 3,696,711 * | 10/1972 | Berg et al. .................. 92/130 A X |
| 3,811,365 | 5/1974 | Gordon et al. . |
| 3,926,094 * | 12/1975 | Kurichh et al. ..................... 92/63 |
| 4,478,319 * | 10/1984 | Casalone et al. ............. 92/130 A X |
| 4,860,640 | 8/1989 | Ware . |
| 5,067,391 | 11/1991 | Choinski . |
| 5,105,727 | 4/1992 | Bowyer . |
| 5,460,076 | 10/1995 | Pierce . |
| 5,507,217 | 4/1996 | Plantan . |
| 5,623,862 | 4/1997 | Hanaway . |
| 5,676,036 | 10/1997 | Choinski . |
| 5,771,774 * | 8/1998 | Stojic .................................. 92/98 D |
| 6,006,651 * | 12/1999 | Pierce et al. .................. 92/130 A X |
| 6,012,378 | 1/2000 | Hicks . |

FOREIGN PATENT DOCUMENTS 3145-757 5/1983 (DE) .

OTHER PUBLICATIONS

Bendix Catalog and Service Data Sheet for "rotochambers" (1981).

* cited by examiner

Primary Examiner—John E. Ryznic
(74) Attorney, Agent, or Firm—Mark D. Miller

(57) ABSTRACT

Disclosed is a diaphragm-based spring brake actuator assembly which allows for the delivery of more force to the push rod without increasing the size of the actuator unit. The invention allows for the use of a stronger heavy main compression spring in the emergency brake chamber to provide greater emergency or parking brake force to the push rod. The invention also allows the service brake chamber to operate more efficiently when braking pressure is introduced. These functions are accomplished through modifications in the design of the actuators which allow for the deployment of a larger pressure plate inside either the emergency housing or the service brake housing, or both, allowing delivery of more force to the push rod of the actuator; and are made possible in actuator units having the same dimensional profile as existing weaker units.

85 Claims, 9 Drawing Sheets

HIGH OUTPUT SPRING BRAKE ACTUATOR

BACKGROUND OF THE INVENTION

1. Field of the Invention

The present invention relates to braking systems for heavy duty vehicles, and in particular to an improved diaphragm-based spring brake actuator which provides significantly increased braking force from a spring brake assembly having a size that is the same as or smaller than existing brake assemblies.

2. Description of the Prior Art

Various forms of pneumatic vehicle spring brake actuators have been introduced over the years primarily for use in the trucking industry. A typical double diaphragm air brake actuator includes two portions: an operator controlled service brake portion which is used for slowing or stopping a vehicle, and an emergency or parking brake portion which automatically engages when air pressure is removed. A typical service brake portion is characterized by a closed housing which contains a movable diaphragm stretched across the inside. One side of the diaphragm is closely associated with a centrally located pressure plate attached to a slidable push rod which extends out of the housing for attachment to the brakes of the vehicle. On the other side of the diaphragm a sealed chamber is formed within the housing.

An opening is provided in the sealed service brake chamber for connection to a pneumatic (air) pressure source usually provided by an on-board air compressor. The brakes of the vehicle can be applied by introducing sufficient pneumatic pressure into the sealed chamber to act against the service brake diaphragm which moves the plate, pushing the push rod out. A small return spring is ordinarily provided inside the service brake housing around the push rod and adjacent to the pressure plate to urge it to retract when the air pressure behind the diaphragm is reduced.

A typical emergency brake portion of an air brake actuator is attached in axial alignment with or made a part of the service brake assembly. The emergency brake is a separate closed housing which contains a heavy main compression spring and a second movable diaphragm creating a second sealed chamber. The emergency brake diaphragm is in contact with a second pressure plate which is also attached to or directly associated with the slidable central push rod of the service brake.

The second sealed chamber is formed inside the emergency brake housing on one side of the diaphragm, and the heavy main compression spring is deployed on the opposite side. As with the service brake, the sealed chamber of the emergency brake is connected to the on-board pneumatic source of the vehicle. As long as sufficient air pressure is provided to the sealed chamber, the diaphragm in the emergency brake will remain fully extended thereby compressing the large spring. However, should pressure fall, or should there be a leak in the sealed chamber, the diaphragm will be unable to hold the large compression spring in place. When this occurs, either slowly or quickly, the large compression spring will move the second pressure plate causing the push rod to be extended out thereby applying the brakes of the vehicle.

Under normal conditions, when the vehicle is parked, the air pressure to the emergency brake portion is cut off causing the large compression spring to apply the brakes.

In the transportation industry, it is becoming ever more desirable to provide more powerful spring brake actuators without changing their size. Increasing load sizes, new regulations and other factors have created a need for additional power in a spring brake with the same dimensional profile as existing double diaphragm spring brakes.

A stronger spring brake which takes up the same or a smaller space can result in great savings in the transportation industry. Under present regulations, a loaded truck must be able to apply its brakes and hold its position on a twenty percent (20%) grade. For many heavy vehicles, in order to accomplish this requires additional brake actuators and/or additional axles with brake actuators on them. With stronger brake actuators, fewer of them are needed to bring or hold such a vehicle at rest, thereby saving the cost of the additional brake actuators and/or additional axles.

There is also a need for a more powerful spring brake which fits into a smaller space. This need is driven by such factors as the installation of vehicle air suspensions, lowered floor heights, shorter wheel bases, and the addition of new and bulky chassis equipment. All of these factors compete for the same space occupied by the spring brake.

A spring brake assembly of smaller size which provides the same power as a larger assembly will also reduce weight and cost. A truck tractor and semi trailer may use 8 spring brake actuators on its axles. Replacing these with smaller units having the same strength that are two pounds lighter will reduce the weight by 16 pounds. While this may not seem significant at first blush, a liquid hauling vehicle is frequently loaded to the exact legal limit. Over the life of that vehicle, the 16 pound reduction will convert to thousands of dollars of hauling revenue.

Stronger brake assemblies deployed in the same space can improve the stopping characteristics of a vehicle thereby potentially increasing the gross vehicle weight allowance for the vehicle (i.e. more payload).

Existing service brake assemblies have been designed for attachment to the brake system of a heavy duty vehicle. The end of the service brake push rod is typically attached to a clevis which is, in turn, attached to the end of a slack adjuster arm located on a cam shaft which makes up part of the foundation brake of the vehicle. The push rod is moved in and out of the service brake assembly using pneumatic pressure as described above in order to operate the brakes of the vehicle. As this occurs, in some situations the push rod and clevis move the end of the slack adjuster through a slightly arcuate path around the cam.

For decades, the pressure plates used in existing diaphragm-based spring brake actuators have been relatively small in comparison to the overall profiles of these units. In a typical brake actuator, the pressure plate in the service brake chamber has approximately the same diameter as the pressure plate in the emergency brake chamber. The edges of such pressure plates have traditionally been restricted to the central portion of the brake chamber, presumably to allow sufficient space around the edges of the plates for the diaphragm to fold over itself. However, these traditional wide tolerances that have developed over time are far more than is necessary for the diaphragm to function properly, and have unnecessarily limited the sizes of the pressure plates used, and therefore unnecessarily inhibit the potential force that can be delivered to the push rod by the spring brake actuator.

SUMMARY OF THE INVENTION

The present invention is a departure from traditional diaphragm-based spring brake actuator assemblies which allows for the delivery of more force to the push rod without increasing the size of the actuator unit. One embodiment of the invention allows for the use of a stronger heavy main compression spring in the emergency brake chamber to provide greater emergency or parking brake force to the push rod. This is accomplished through novel changes to the design of the emergency brake chamber which allow it to more efficiently hold off the spring. A stronger emergency spring gives the brake actuator a greater capacity to hold a vehicle in place while parked on a grade. Another embodiment of the invention employs similar novel changes to the design of the service brake chamber which allow it to operate more efficiently when braking pressure is introduced.

In the present invention, the pressure plate deployed inside either the emergency housing or the service brake housing, or both, is significantly larger than the corresponding plate(s) found in existing units having the same dimensional profile. The plate(s) of the present invention have a greater diameter and a larger circumference thereby defining a larger area.

With respect to the emergency spring brake, the size of the pressure plate is directly proportional to the amount of force needed to hold off the large compression spring in the emergency brake housing. According to the formula F=PA, the force (F) exerted against the compression spring is equal to the amount of pressure (P) exerted by the chamber multiplied by the area (A) of the pressure plate over which it is exerted. Thus, increasing the size of the pressure plate increases the area (A) over which the pressure (P) is exerted, thereby increasing the force (F) against the spring. For illustrative purposes and by way of example only, and without limiting the scope of the appended claims herein, a pressure (P) of 60 pounds per square inch (60 psi) exerted against a pressure plate in the emergency brake housing having an area of 30 square inches results in a force of 1,800 pounds. In this example, if the area of the pressure plate is increased to 35 square inches, the resulting force of the spring that may be held off increases to 2,100 pounds. Thus, by simply increasing the surface area of the pressure plate, in this example an emergency brake spring that is over 14% stronger may be used (i.e. held off). Typical increases provided by the present invention are in the range of about twenty percent (20%).

The availability of higher pressure (P) will also increase the amount of force (F) available to hold off the emergency brake spring. Thus, by increasing the surface area (A) of the pressure plate alone or in conjunction with increasing the available pressure (P), a much stronger spring may be used in the emergency brake.

With respect to the service brake, the size of the pressure plate therein is directly proportional to the amount of force applied to the push rod. Again, using the formula F=PA, the force (F) applied to the push rod is equal to the amount of pressure (P) exerted by the chamber multiplied by the area (A) of the pressure plate over which it is exerted. Thus, increasing the size of the pressure plate increases the area (A) over which the pressure (P) is exerted, thereby increasing the force (F) applied to the push rod. For illustrative purposes and by way of example only, and without limiting the scope of the appended claims herein, a pressure (P) of 60 pounds per square inch (60 psi) exerted against a pressure plate in the service brake housing having an area of 30 square inches results in a force of 1,800 pounds applied to the push rod. In this example, if the area of the pressure plate is increased to 35 square inches, the resulting force applied to the push rod increases to 2,100 pounds. Thus, by simply increasing the surface area of the pressure plate, in this example the service brake becomes 14% more efficient (i.e. stronger). Typical increases provided by the present invention are in the range of about twenty percent (20%).

The present invention facilitates increasing the size of the either the emergency brake pressure plate or the service brake pressure plate, or both, by incorporating one or more of the following features. First, the cylindrical walls of the spring brake housing may be made more vertical, more parallel to the orientation of the push rod, and/or more nearly perpendicular to the orientation of the pressure plate inside the housing. Next, the space between the outside circumferential edge of the pressure plate and the inside of the cylindrical wall of the brake housing (this space sometimes hereafter referred to as the "gap") may be reduced to a size that is as small as about two and one half (2½) times the thickness of the diaphragm material, or even smaller (e.g 2¼ times said thickness), thereby providing room for a larger pressure plate. Next, the diaphragm itself may be made of very thin material in order to further minimize the size of the above described gap in order to maximize the size of the pressure plate. Next, axial movement of the main compression spring may be minimized by minimizing side load exerted by said spring. This is accomplished by grinding down a portion of the surfaces of the end spring coils (the coils at the top and at the bottom of the spring) so that these coils seat more predictably against the housing and pressure plate. Finally, configuring the shape of the pressure plate to nest with an adaptor plate located on the central shaft of the brake actuator helps keep the pressure plate in central alignment. A bushing/seal retainer may also be employed in the center of the spring housing to help align the larger pressure plate in order to prevent it from drifting sideways. Each of these features, used alone or in conjunction with each other, allows for deployment of a larger pressure plate which can then be used to hold off a stronger spring in the emergency brake housing, or to provide more force to the push rod in the service brake housing.

The use of more vertical cylindrical walls in the present invention increases the interior cross sectional area of the emergency brake housing, thereby allowing for the surface area of the pressure plate to also be increased. This is accomplished without raising the height or width of the cylinder;thus, the overall profile of the brake actuator remains the same.

Through experimentation, it has been determined that the size of the pressure plate may be increased until the above-described gap between the circumferential edge of the pressure plate and the inside wall of the housing is as small as two and one half (2½) times the thickness of the diaphragm material without any significant degradation in diaphragm performance. Existing brake actuators unnecessarily provide much larger gaps between the edges of the pressure plate and the walls of the housing which range from four and one half (4½) up to seven (7) times the thickness of the diaphragm material. In the present invention, the surface area of the pressure plate that is gained by closing this gap is substantial. When combined with more vertical cylindrical walls, even more space is made available for the pressure plate.

The use of thinner diaphragm material allows the edges of the pressure plate to extend even closer to the cylindrical walls of the housing, thereby allowing for an even greater increase in the surface area of the pressure plate. Existing brake actuators use diaphragm materials having an average thickness of 0.125 inches, a tight one having a gap of 0.57 inches between the edge of the pressure plate and the wall of the housing (about 4½ times the thickness of the diaphragm). This gap may be reduced, as above, in the present invention down to as small as 2½ times the diaphragm thickness, or even smaller (e.g. 2½×0.125=0.3125 inches; 2¼×0.125=0.2813 inches). For illustrative purposes and by way of example only, and without limiting the scope of the appended claims herein, if the thickness of the diaphragm material is reduced to 0.110 inches, then the gap may be further reduced to 2½×0.110=0.275 inches (or 2¼×0.110=0.2475 inches), providing even more room for a larger pressure plate.

Maintaining proper alignment of the larger pressure plate of the present invention is important. This may be accomplished in one or more of several ways. First, an adaptor plate may be employed on the central shaft of the brake actuator on one side of the diaphragm which works in conjunction with a recessed area on the underside of the pressure plate on the other side of the diaphragm. As the pressure plate moves up and down, this adaptor plate nestles through the diaphragm into the recessed area, keeping the pressure plate in central alignment. Alignment may also be improved through the use of a bushing/seal retainer in the center of the spring housing. Alignment may be further improved by reducing the side load of the main compression spring by grinding down the exterior surfaces of the end coils of the spring. Traditionally, such springs have a side load of 6 to 8 percent; in the present invention, reducing this load to 2 or 3 percent greatly improves alignment of the main spring in the emergency housing.

It is to be noted that the improved performance of the diaphragm-based brake actuators of the present invention is accomplished using the same circumferential dimensions as existing brake actuators using common membrane diaphragm materials. The diaphragm is not attached in the center of the actuator, it does not use a moving wall, and it does not have any opening or hole in the center thereof.

Historically, the effective surface area of spring brake pressure plates has been standardized into different types (9, 12, 16 20, 24, 30 and 36), each type providing an incrementally larger braking strength. This allows for standard components and parts to be manufactured for each type. For each type, there is also an incrementally larger associated profile (size) for the brake actuator. Using the design of the present invention, a smaller type (e.g. 24) having a smaller profile may have the strength of a larger type with a larger profile (e.g. 30). A smaller unit utilizing the features of the present invention may be employed as a replacement for a larger type, but requiring a smaller space. In addition, the present invention now makes a new type 43 unit available in the space occupied by a type 36.

It is therefore a primary object of the present invention to provide a stronger diaphragm-based spring brake actuator unit without increasing the overall size of the unit.

It is also a primary object of the present invention to provide a diaphragm-based spring brake actuator unit that is able to hold of a stronger emergency brake spring without increasing the overall size of the unit.

It is a further primary object of the present invention to provide a diaphragm-based spring brake actuator unit that is able to provide more force to the push rod from the service brake assembly without increasing the overall size of the unit.

It is a further important object of the present invention to provide a stronger diaphragm-based spring brake actuator unit having at larger pressure plate inside of either the emergency brake housing, the service brake housing, or both.

It is a further important object of the present invention to provide a stronger diaphragm-based spring brake actuator unit having more vertical cylindrical walls on the brake housing to accommodate a larger pressure plate inside.

It is a further important object of the present invention to provide a stronger diaphragm-based spring brake actuator unit having a very tight gap between the outside circumferential edge of the pressure plate and the inside of the cylindrical wall of the emergency brake housing to provide more room for a larger pressure plate inside.

It is a further important object of the present invention to provide a stronger diaphragm-based spring brake actuator unit having a diaphragm made of thinner material in the emergency brake housing to provide more room for a larger pressure plate inside.

It is a further object of the present invention to provide a smaller, stronger diaphragm-based spring brake actuator unit in order to allow for more room for air suspensions and other parts underneath the vehicle to which it is attached.

It is a further object of the present invention to provide a stronger diaphragm-based spring brake actuator unit that is retrofittable onto existing brake assemblies.

Additional objects of the invention will be apparent from the detailed descriptions and the claims herein.

DETAILED DESCRIPTION OF THE PREFERRED EMBODIMENTS

Figure 1:
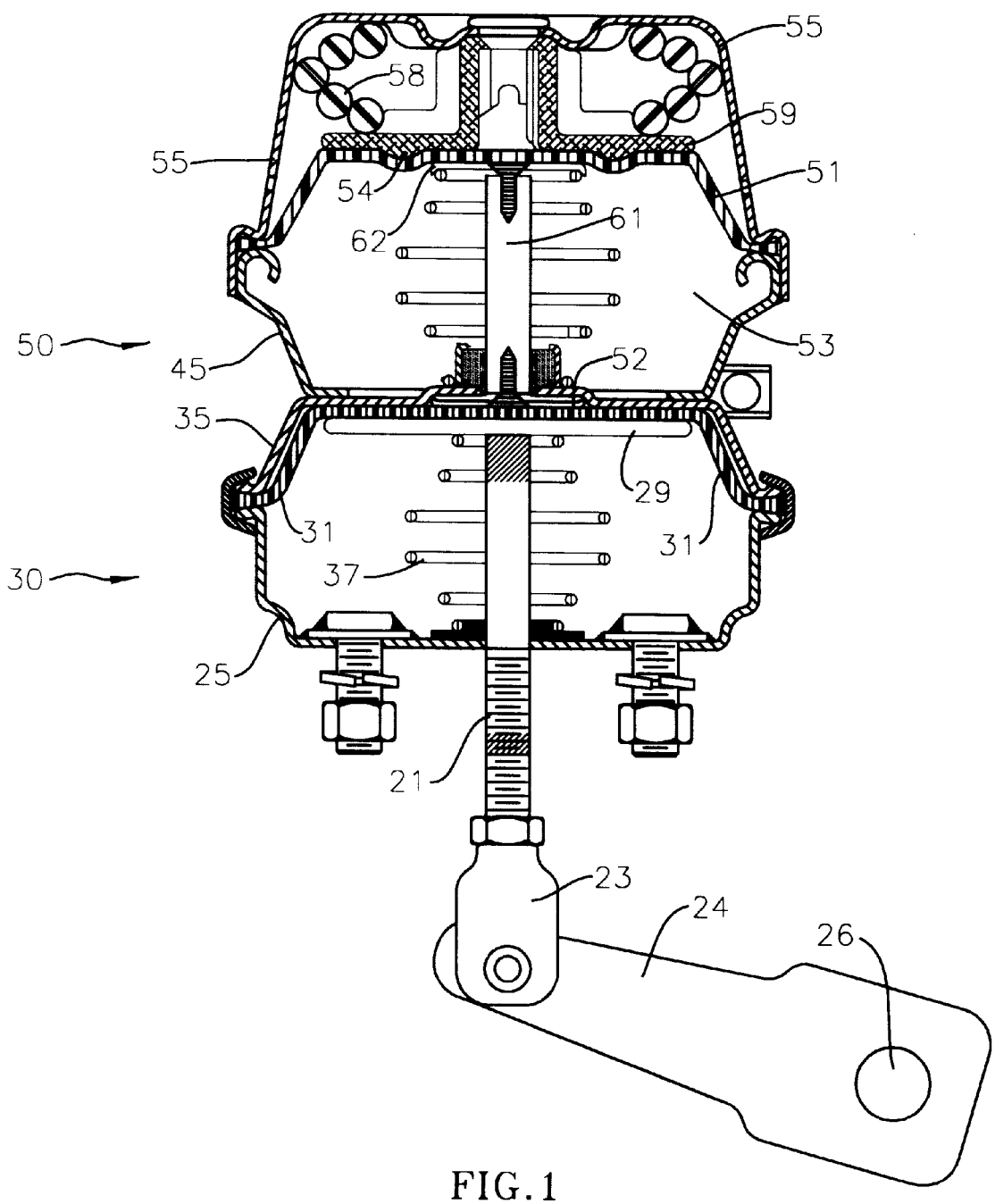
FIG. 1 is a cross sectional side view of a typical brake actuator in the normal driving position, the emergency spring being held off by the pressure of the upper chamber.
Figure 2:
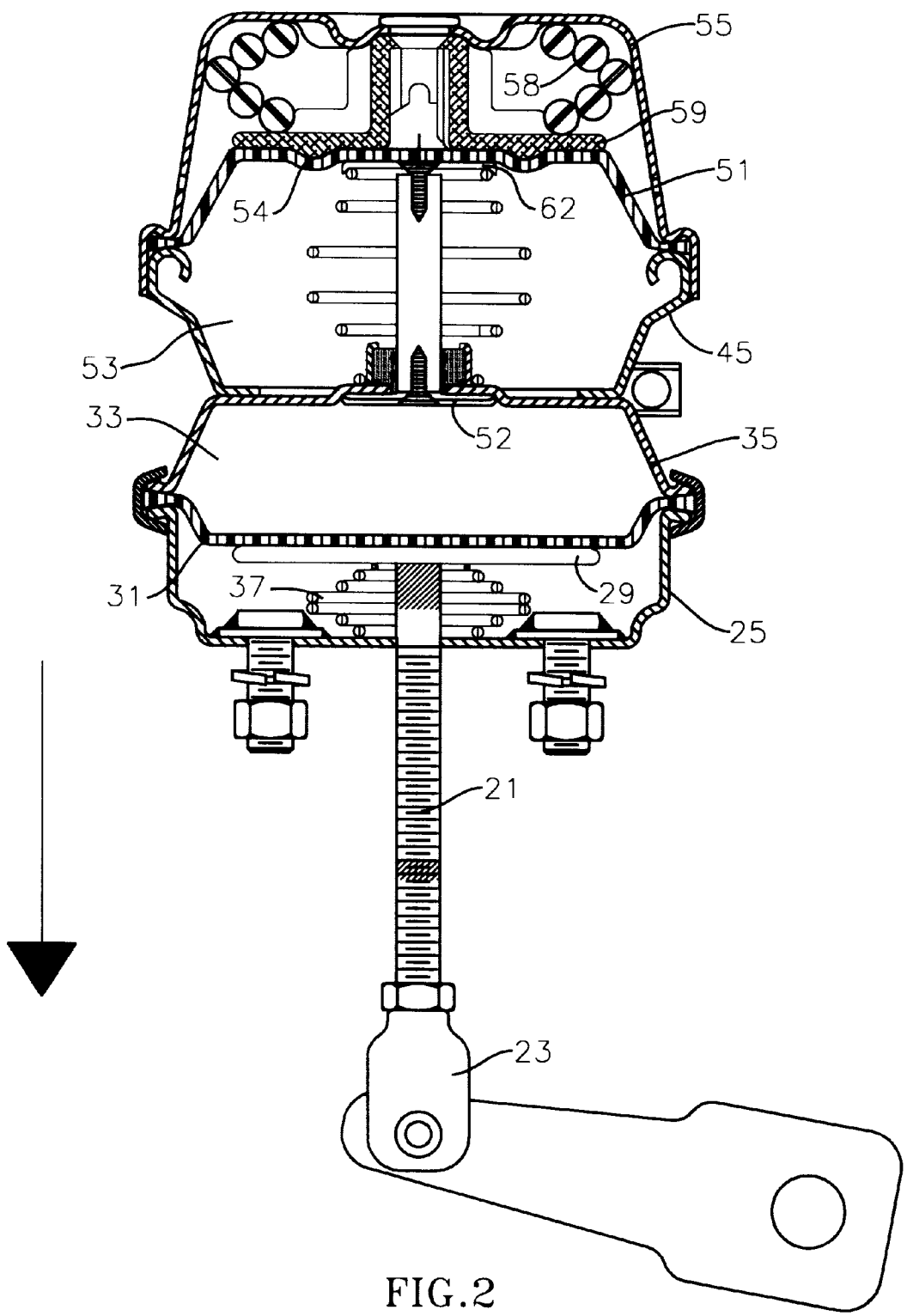
FIG. 2 is a cross sectional side view of a typical brake actuator in the normal driving position with the service brake being applied by the vehicle operator.
Figure 3:
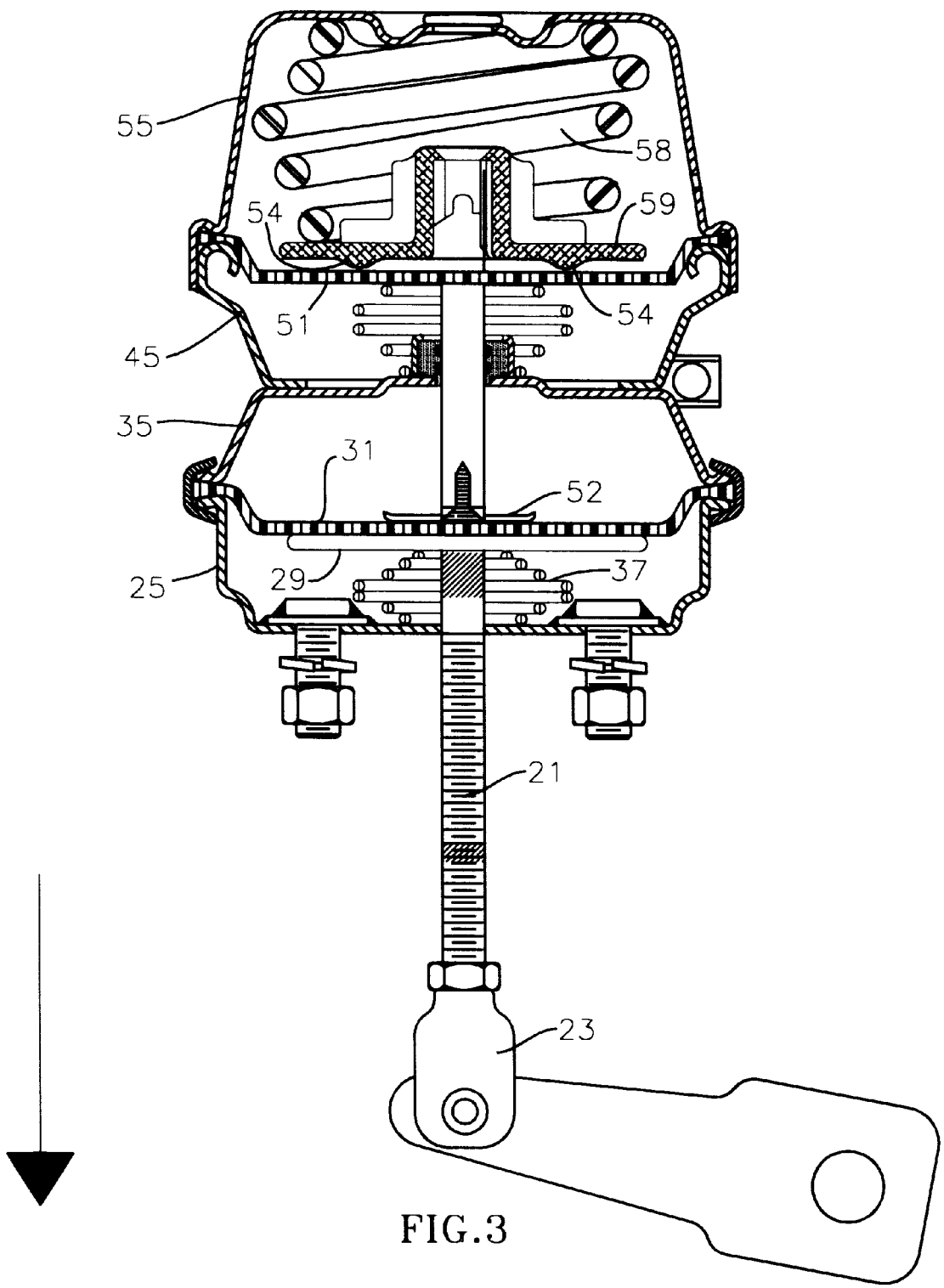
FIG. 3 is a cross sectional side view of a typical brake actuator showing it in the parked condition, with the emergency spring brake activated.

Referring to the drawings wherein like reference characters designate like or corresponding parts throughout the several views, and referring particularly to the prior art actuator shown in FIGS. 1–3, it is seen that a typical dual diaphragm air brake actuator, generally 20, is comprised of a service brake assembly, generally 30, and an emergency brake assembly, generally 50. While each of these assemblies may be deployed independently of the other, when combined the service brake assembly and emergency brake assembly are in axial alignment with each other along the path of a push rod 21 which extends out from the center of one end of the service brake assembly.

The distal end of push rod 21 extends out from lower service brake housing cup 25 and is attached to a clevis 23 which is, in turn, attached to a slack adjuster 24 attached to a rod or cam 26 associated with the brakes of a vehicle. Thus, as push rod 21 moves in and out of the service brake assembly 30, it exerts force to the brakes of the vehicle. The proximal end of push rod 21 is attached to or closely associated with a pressure plate 29 located inside the service brake assembly 30. A flexible service brake diaphragm 31 is provided inside assembly 30 above plate 29, and is sealed at its edges to define a chamber 33 in conjunction with the upper exterior housing 35.

When pressurized air is introduced into chamber 33, diaphragm 31 expands exerting pressure against plate 29 thereby pushing rod 21 out of assembly 30 as shown in FIG. 2. The application of pressure to chamber 33 of the service brake assembly 30 is controlled by the operator of the vehicle through normal operation of the brakes. The amount of pressure applied to chamber 33 may be varied resulting in a greater or lesser extension of rod 21, and a greater or lesser application of the vehicle brakes. A retraction spring 37 is provided in lower housing 25 around rod 21 to urge plate 29 and rod 21 back inside assembly 30 when air pressure is removed from chamber 33, as shown in FIG. 1.

The emergency brake assembly 50 includes a lower housing cup 45 and an upper housing cup 55. A diaphragm 51 is provided inside assembly 50, sealingly attached at its edges between upper and lower cups 45 and 55, to define a chamber 53 in conjunction with the lower housing cup 45. An extension rod 61 having the same diameter and characteristics as push rod 21 is provided in the center of assembly 50 and inside chamber 53, axially aligned with push rod 21. The distal end of rod 61 extends through a sealed opening at the center of lower housing cup 45 and into the upper housing cup 35 of the service brake assembly 50. The distal end of rod 61 is attached to a small plate 52 inside service assembly 30.

The proximal end of rod 61 is also attached to a small adaptor push rod plate 62 located inside chamber 53. Adaptor plate 62 is in contact with diaphragm 51. Above diaphragm 51 is the pressure plate 59 of the emergency brake, above which the main compression spring 58 is located. The lower surface of pressure plate 59 includes a relief area 54. By fully pressurizing chamber 53, diaphragm 51 is expanded and pressed against pressure plate 59, compressing main spring 58 into the upper end of housing cup 55, as shown in FIGS. 1 and 2. When pressure is released from chamber 53 either by the stopping of the vehicle or from a failure in the pressure system, main spring 58 presses down against plate 59 pushing diaphragm 51, plate 62 and rod 61 downward. The force of main spring 58 against plate 59 is transmitted through diaphragm 51 to plate 62, rod 61, plate 52, diaphragm 31, plate 29 and rod 21 to the brakes of the vehicle, as shown in FIG. 3. When such force is exerted, plate 62 nests within the relief area 54 of pressure plate 59.

Figure 4:
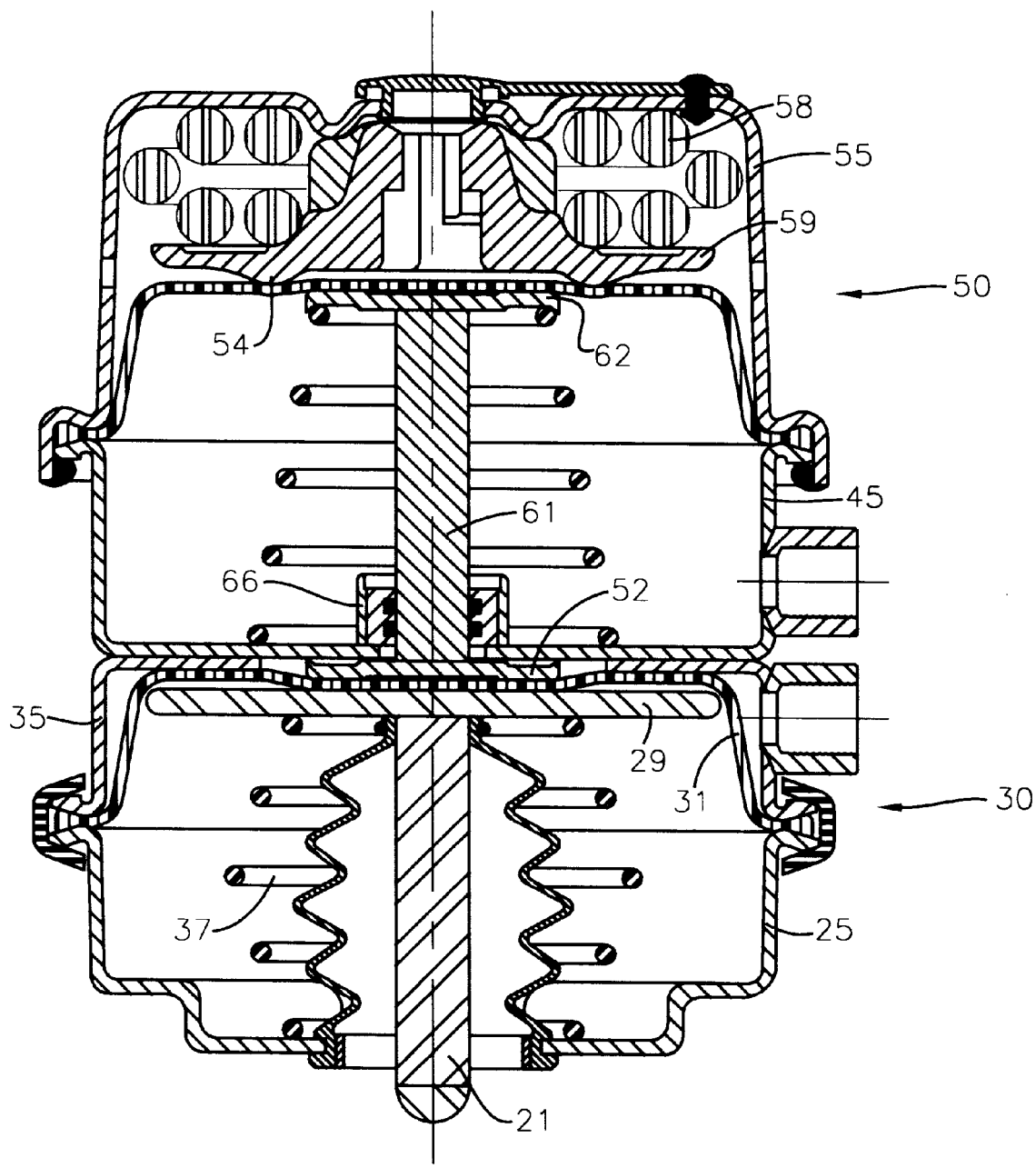
FIG. 4 is a cross sectional side view of a combined emergency and service brake actuator of the present invention.
Figure 5:
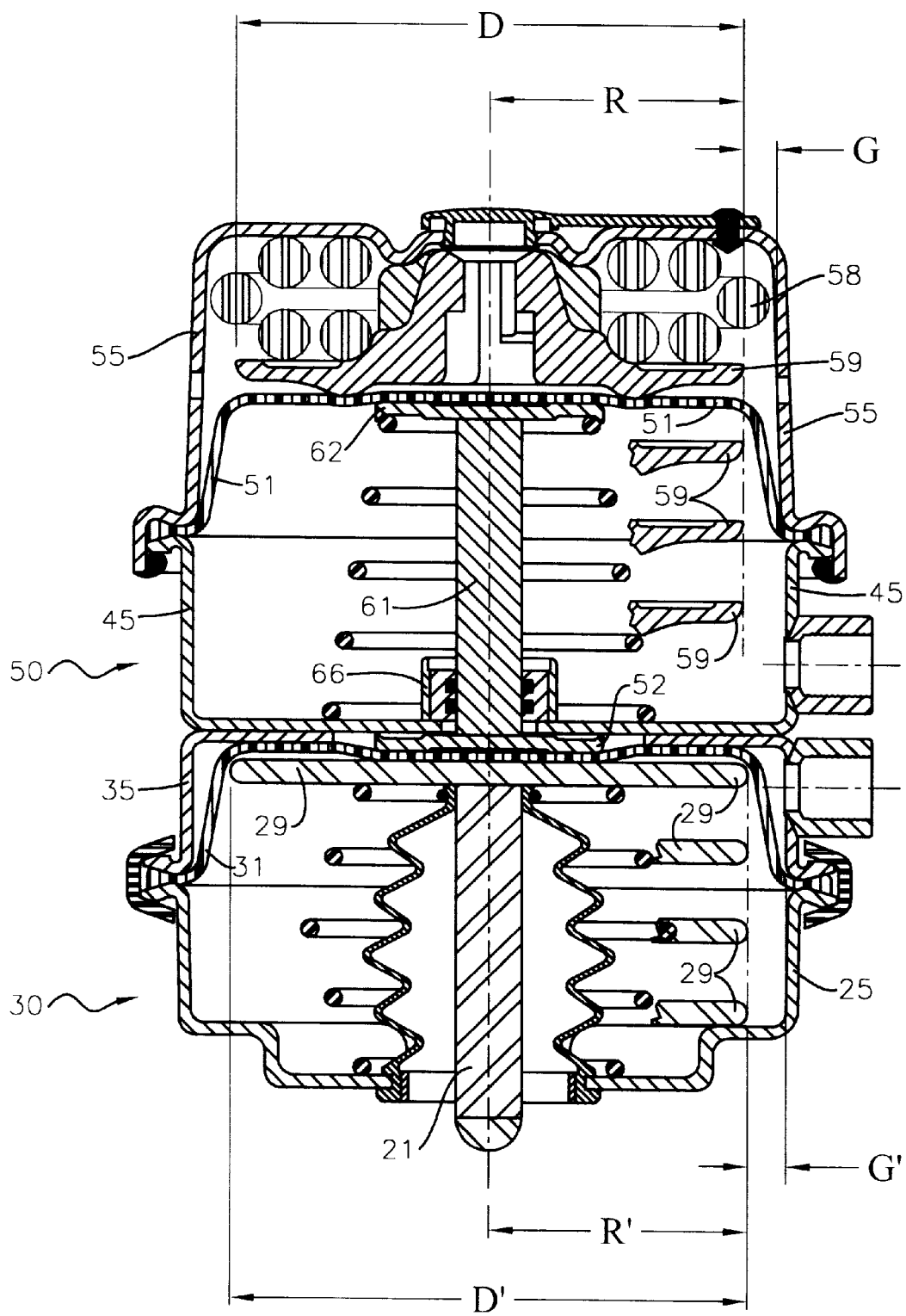
FIG. 5 is a cross sectional side view of a combined emergency and service brake actuator of the present invention showing the descending positions of the pressure plates of each actuator.
Figure 6:
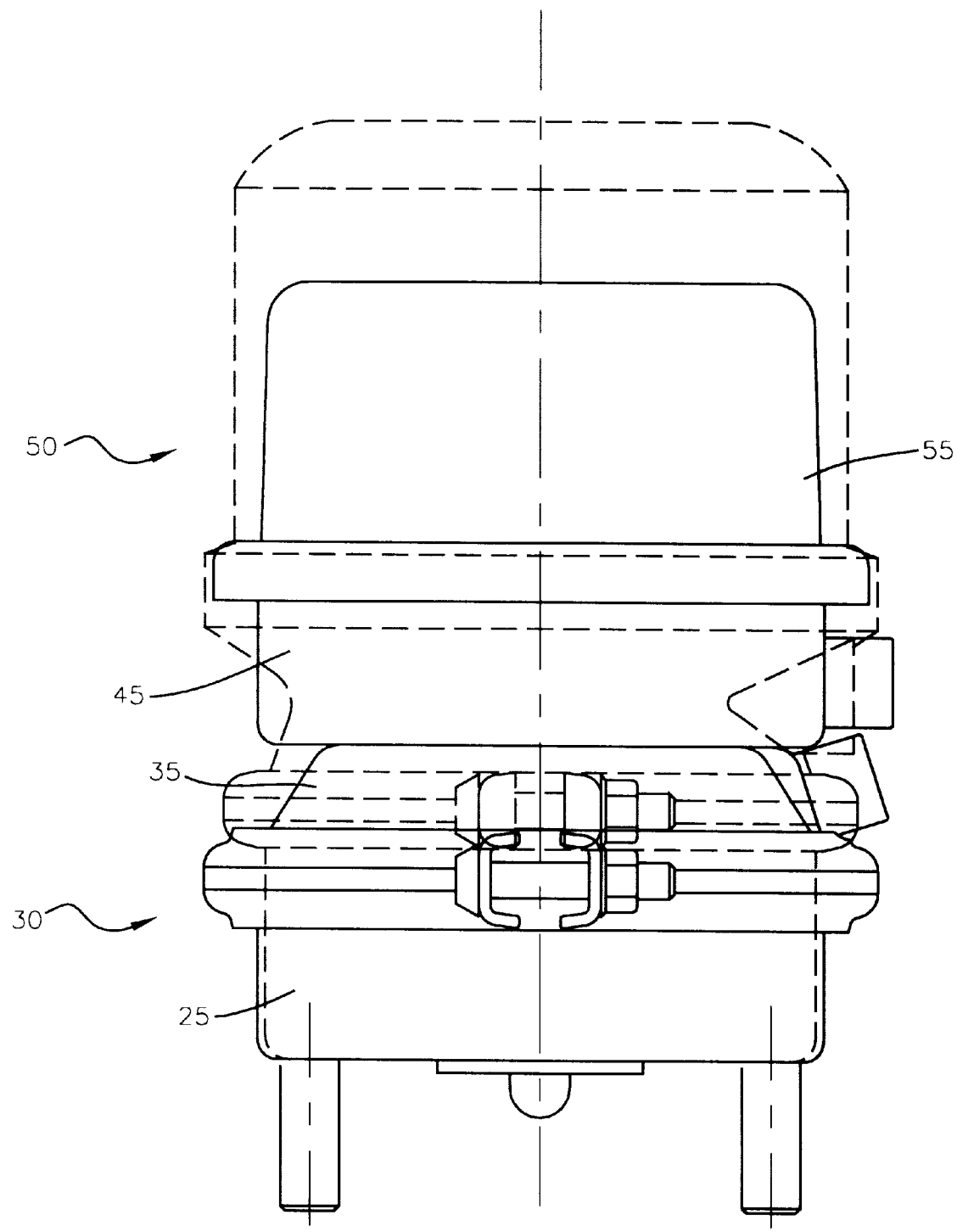
FIG. 6 is a side view of the present invention comparing its profile to an existing competitive brake unit (shown in phantom lines).
Figure 7:
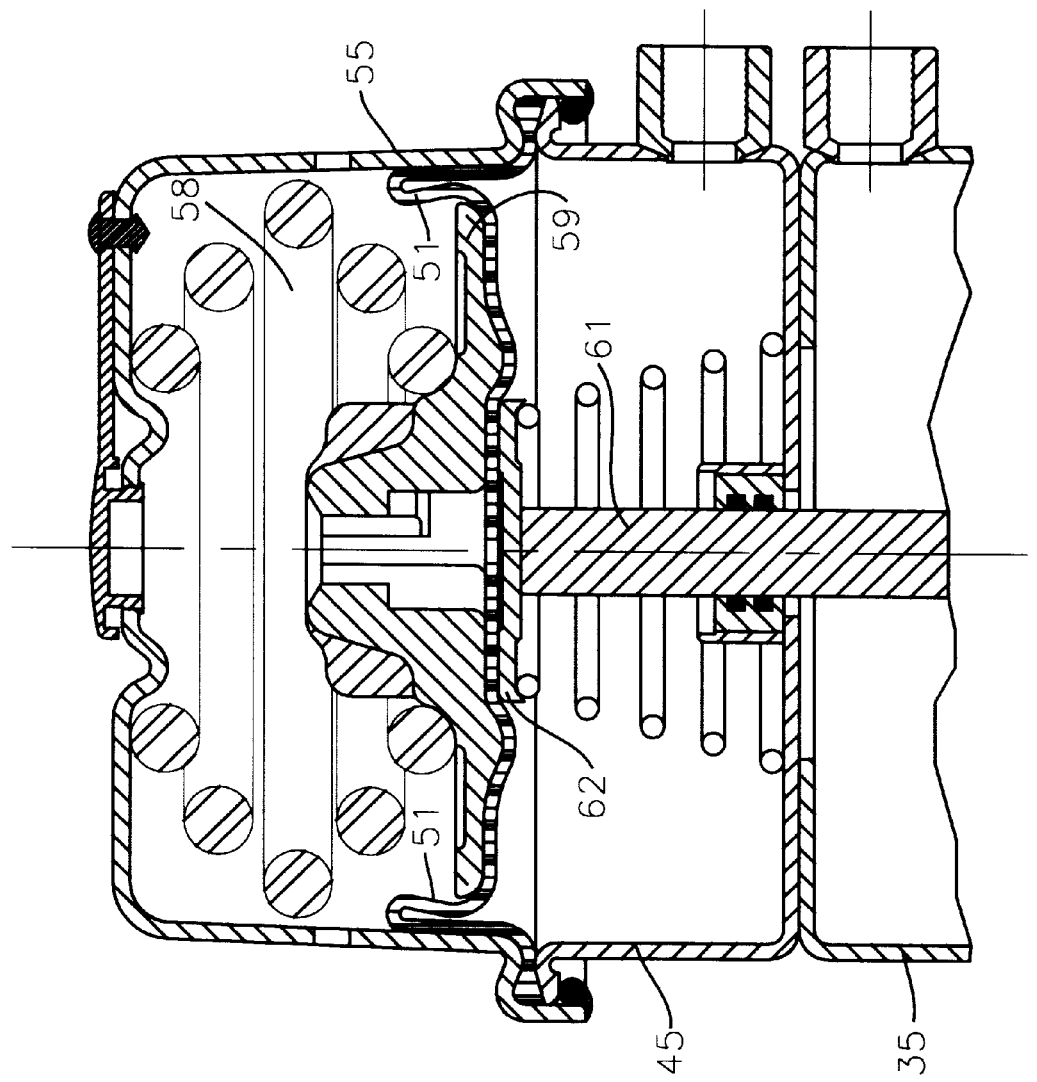
FIG. 7 is an enlarged cross sectional side view of an emergency brake chamber of the present invention showing the curling of the diaphragm inside the housing as the pressure plate descends.
Figure 8:
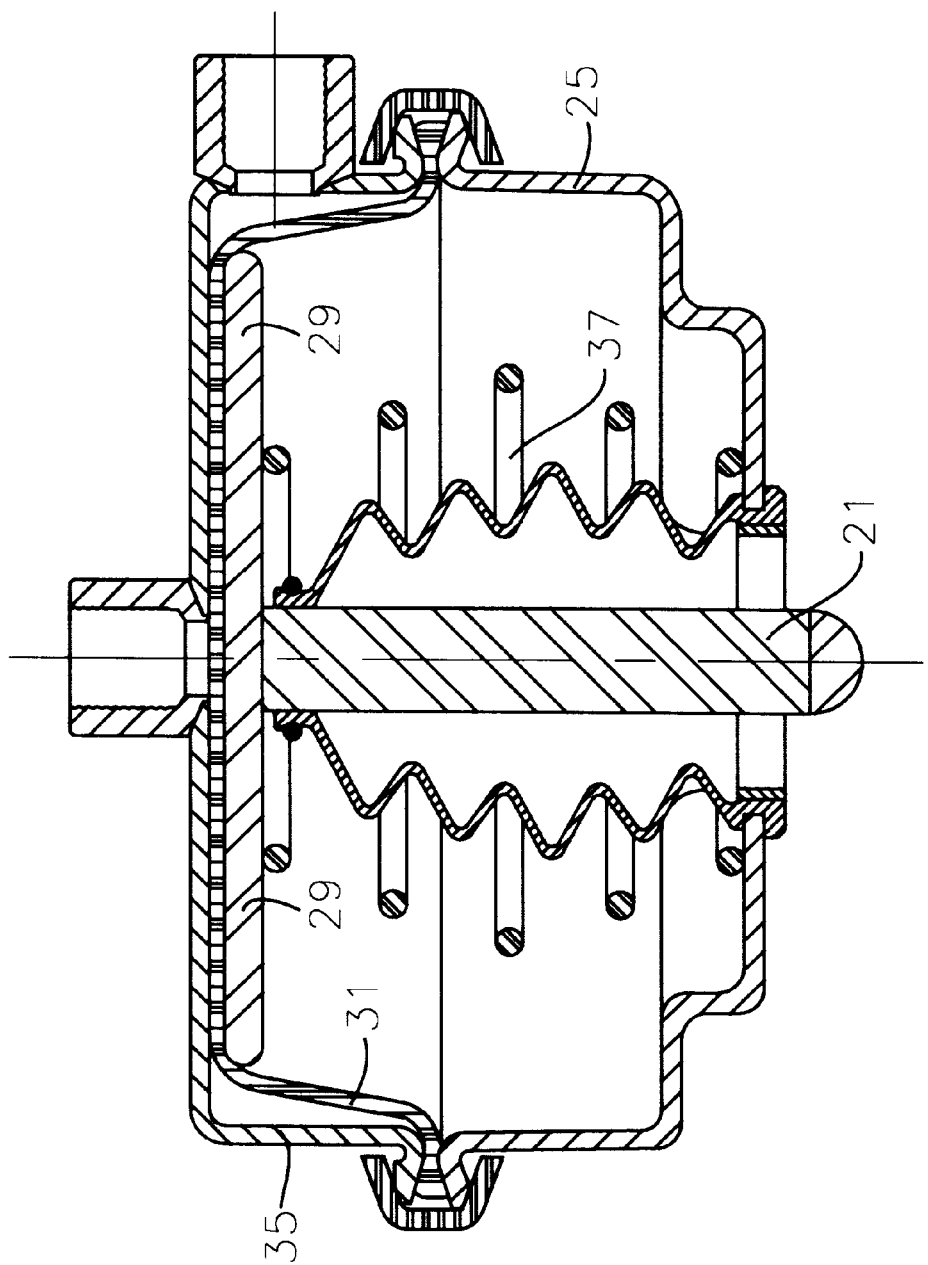
FIG. 8 is an enlarged cross sectional side view of a service brake chamber of the present invention.

Referring to FIGS. 4 and 5, it is seen that the upper pressure plate 59 of the present invention is large, and that the edges of plate 59 come very close to the cylindrical side walls of cups 45 and 55. These side walls are vertical or nearly vertical (i.e. they are parallel or nearly parallel to rod 61, and perpendicular or nearly perpendicular to plate 59). The cylindrical wall of cup 55 is only tapered above the uppermost position of plate 59 as shown in FIG. 4. The upright cylindrical walls of cups 45 and 55 provide a consistently wider space inside assembly 50 through which pressure plate 59 may be raised and lowered (see FIG. 5). The gap between the outside circumferential edge of plate 59 and the inside of the cylindrical walls of cups 45 and 55 is depicted as "G" in FIG. 5. This gap may be as small as two and one half (2½) times the width (thickness) of diaphragm 51, or smaller. This allows sufficient space for diaphragm 51 to expand or fold over itself (i.e. twice its width) as plate 59 moves up and down, plus a small additional space (½ its width, or less) to avoid unnecessary friction. See FIG. 7. A lesser additional space (resulting in an even larger pressure plate) may be available with certain low friction diaphragm materials.

With respect to the service brake housing shown in FIGS. 4 and 5, it is seen that the upper pressure plate 29 of the present invention is also very large, and that the edges of plate 29 come very close to the cylindrical side walls of cups 25 and 35. These side walls are also vertical or nearly vertical (i.e. they are parallel or nearly parallel to rod 21, and perpendicular or nearly perpendicular to plate 59). The upright cylindrical walls of cups 35 and 25 provide a consistently wider space inside assembly 30 through which pressure plate 29 may be raised and lowered (see FIG. 5). The gap between the outside circumferential edge of plate 29 and the inside of the cylindrical walls of cups 25 and 35 is depicted as G' in FIG. 5. This gap may also be as small as two and one half (2½) times the width (thickness) of diaphragm 31, or smaller. This allows sufficient space for diaphragm 31 to expand or fold over itself (i.e. twice its width) as plate 29 moves up and down, plus a small additional space (½ its width, or less) to avoid unnecessary friction. A lesser additional space (resulting in an even larger pressure plate) may be available with certain low friction diaphragm materials.

Diaphragms 31 and 51 may be made of a very thin material. Instead of an average width of 0.125 inches, diaphragm materials as thin as 0.110 inches have been successfully used, and even thinner diaphragm materials may also be used. Using a standard diaphragm of 0.125 inches, gaps G and G' (at 2½ times this thickness) could be as small as 0.3125 inches. Reducing the diaphragm thickness to 0.110 inches results in a gap G or G' as small as 0.275 inches. Using a low friction material may allow a gap G or G' of 2¼ times its thickness which, for the 0.110 diaphragm would result in a very small gap G or G' of 0.2475 inches. A thinner diaphragm material will reduce gap G or G' even further. Each of these modifications, used together or separately, allows for a larger pressure plate to be installed inside the housing.

Figure 9:
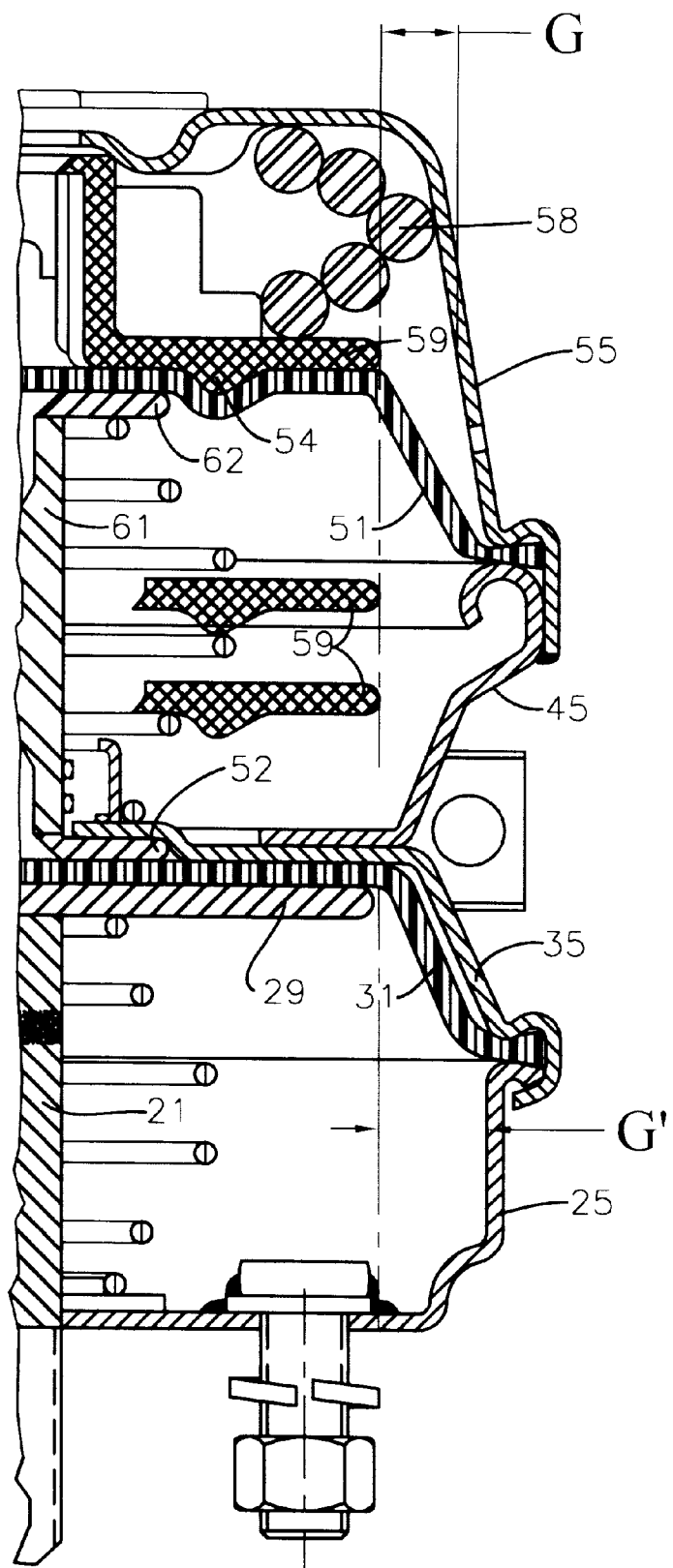
FIG. 9 is an enlarged cross sectional side view of a typical prior art actuator.

The smallest known gap G or G' in an existing brake actuator is 0.57 inches using a diaphragm having a thickness of 0.125 inches (see FIG. 9). This gives a ratio of diaphragm thickness to gap size of 1:4.56. The present invention provides a smaller ratio which can be as low as 1:2.5 or lower. Embodiments having a ratio of diaphragm thickness to gap size ranging from 1:4.56 to 1:2.5 or smaller will allow ever increasing space for larger and larger pressure plates 29 and 59. This provides for a range of pressure plate sizes and corresponding strengths for the main compression spring 58 within the emergency housing, and for the available braking strength in the service housing.

The area (A) of a circle such as the pressure plates 29 and 59 of the present invention is determined according to the well known formula $A=R^2$ where (R) is the radius of the circle defined by the pressure plate, and =approximately 3.14159. This formula may also be stated as $A=\frac{1}{4}D^2$ where (D) is the diameter of the circle defined by the pressure plate. See FIG. 5 where D and R are used for plate 59, and D' and R' are used for plate 29. The inside sectional area of the cylindrical housing cups (55 and 45 in the emergency brake housing, and 35 and 25 in the service brake housing) may also be defined by the same formulas, where D is the diameter of the available inside circumferential wall of cups 55 and 45 in the emergency brake housing, and D' for the cups 35 and 25 in the service brake housing.

Using the above formulas, the possible areas (A) for pressure plate 59 relative to gap G defined by the present invention range from as large as about $(R-2.5x)^2$ to as small as about $(R4.56x)^2$ where "R" is the radius of the inside circumferential wall of cups 55 and 45 through which plate 59 travels, and "x" is the thickness of the diaphragm 51. Stated with the other formula, the range is from about $\frac{1}{4}(D-5x)^2$ to about $\frac{1}{4}(D-9.12x)^2$. For illustrative purposes and by way of example only, and without limiting the scope of the appended claims herein, if the available inside diameter (D) of the housing cups 45 and 55 is eight inches (8"), and a diaphragm 51 having a thickness "x" of one eighth inch (0.125") is employed, then the possible area (A) sizes for plate 59 defined by the present invention range from about 42.718 to about 36.961 square inches [$\frac{1}{4}(7.375)^2$ to $1\frac{1}{4}(6.86)^2$]. Employing a diaphragm 51 having a thickness "x" of 0.110 inches in this example results in a larger area (A) range for plate 59 of between about 44.77 and about 40.48 square inches. Straightening the outside walls of cups 45 and 55 to create an available diameter of more than eight inches will increase the available area (A) for plate 59 even more.

These same principles also apply to the service brake assembly 30 defined by cups 25 and 35, and using pressure plate 29. Using the above formulas, the possible areas (A) for the pressure plate 29 relative to gap G' defined by the present invention range from as large as about $(R'-25x)^2$ to as small as about $(R'4.56x)^2$ where R' is the radius of the inside circumferential wall of cups 35 and 25 through which plate 29 travels, and "x" is the thickness of the diaphragm 31. Stated with the other formula, the range is from about $\frac{1}{4}(D'-5x)^2$ to about $\frac{1}{4}(D'-9.12x)^2$. Employing a thinner diaphragm 31 and/or straightening the outside walls of cups 35 and 25 to create a larger available inside diameter will increase the available area (A) for plate 29 even more.

The circumference of plate 59 (or 29) is defined by the formula 2 R(2 R' for plate 29) or D(D' for plate 29). Using this formula, the range of circumference for plate 59 ranges from as large as about 2 (R-2.5x) to as small as about 2(R-4.56x) where R is the radius of the inside circumferential wall of cups 45 and 55 through which plate 59 travels, and "x" is the thickness of the diaphragm 51. The same formulas apply to the service brake using R' for the inside circumferential wall of cups 25 and 35 through which plate 29 travels, and "x"' for the thickness of diaphragm 31: about 2 (R'-2.5x')to as small as about 2(R'-4.56x').

Stated with the other formula, the range in circumference for the plate is from about (D-5x) to about (D'-912x). Employing a thinner diaphragm 31 (or 51) and/or straightening the outside walls of cups 35 and 25 (or 45 and 55) to create a larger available inside diameter will increase the available circumference for plate 29 (or 59) even more.

The improvements of the present invention may be applied to a single-diaphragm stand alone service brake actuator, to a single-diaphragm stand alone emergency brake actuator, or to a combined service and emergency brake actuator.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. In a fluid pressure-operated diaphragm spring brake having a housing, a cup shaped single piece elastomeric diaphragm suspended within said housing and being sealingly attached to the edges thereof to form at least one chamber therein, a circular pressure plate horizontally deployed in said housing having a generally flat surface adjacent to said diaphragm, said pressure plate having no peripheral guide and being associated with a brake actuating rod disposed in said housing and extending through a centrally disposed opening in the first end wall for reciprocating movement relative to the housing, the improvement comprising a mechanism for providing increased force without increasing the maximum outside dimension of said assembly and without increasing the air pressure supplied to said assembly wherein said housing includes a side wall having a generally cylindrical shape, said side wall has a substantially vertical orientation relative to said pressure plate, and said side wall has a generally consistent diameter in the region where the pressure plate moves, and wherein the outside circumferential edge of said pressure plate extends substantially to the inside edge of said cylindrical side wall leaving a narrow gap therebetween, and wherein the edges of said diaphragm attached to said side wall are capable of stretching substantially vertical when said diaphragm is fully expanded.

2. The mechanism of claim 1 wherein a diaphragm having a thin cross section is used.

3. The mechanism of claim 2 wherein the area of said pressure plate is maximized by reducing the gap between the outside circumferential edge of said circular pressure plate and the inside cylindrical side wall through which said plate travels to a size that is between about 2½ and about 4 times the thickness of the diaphragm adjacent to such plate.

4. The mechanism of claim 2 wherein the gap between the outside circumferential edge of said circular pressure plate and the inside of said cylindrical side wall through which said plate travels is greater than about twice the thickness of said diaphragm and less than about 0.57 inches.

5. The mechanism of claim 1 wherein the gap between the outside circumferential edge of said circular pressure plate and the inside of said cylindrical side wall through which said plate travels is greater than about twice the thickness of said diaphragm and less than about 0.5 inches.

6. The mechanism of claim 1 wherein the circumference of said plate is greater than about 2(R-4.56x) wherein x is the thickness of said diaphragm, R is the radius of the inside of said cylindrical side wall through which said plate travels.

7. The mechanism of claim 1 wherein the circumference of said plate is greater than about 2(R-4.5x) wherein x is the thickness of said diaphragm, R is the radius of the inside of said cylindrical side wall through which said plate travels.

8. The mechanism of claim 1 wherein the circumference of said plate is between about 2(R-4.56x) and about 2(R-2.25x) relative to said diaphragm and said housing wherein x is the thickness of said diaphragm, R is the minimum radius of the inside of said cylindrical side wall through which said plate travels.

9. The mechanism of claim 1 wherein the circumference of said plate is between about 2(R-4.5x) and about 2(R-2.5x) relative to said diaphragm and said housing wherein x is the thickness of said diaphragm, R is the minimum radius of the inside of said cylindrical side wall through which said plate travels.

10. The mechanism of claim 2 wherein the area of said pressure plate is further maximized by reducing the thickness of said diaphragm.

11. The mechanism of claim 10 wherein said diaphragm has a thickness of between 0.110 inches and 0.125 inches.

12. The mechanism of claim 3 wherein the area of said pressure plate is further maximized by reducing the thickness of said diaphragm.

13. The mechanism of claim 12 wherein said diaphragm has a thickness of between 0.110 inches and 0.125 inches.

14. The mechanism of claim 8 wherein the area of said pressure plate is further maximized by reducing the thickness of said diaphragm.

15. The mechanism of claim 14 wherein said diaphragm has a thickness of between 0.110 inches and 0.125 inches.

16. The mechanism of claim 9 wherein the area of said pressure plate is further maximized by reducing the thickness of said diaphragm.

17. The mechanism of claim 16 wherein said diaphragm has a thickness of between 0.110 inches and 0.125 inches.

18. An air-operated brake assembly for a vehicle comprising a service brake housing, a spring brake housing arranged in tandem with and attached to said service brake housing, a brake actuating push rod having one end extending outwardly from said service brake housing and another end disposed internally of said service brake housing for reciprocating motion relative thereto, an actuator rod disposed in said spring brake housing in alignment with said brake actuating push rod, an elastomeric diaphragm suspended within said spring brake housing and being sealingly attached to the edges thereof to form at least one chamber therein, a main compression spring disposed in said spring brake housing having one end engaging a generally horizontal end wall of said spring brake housing, a large circular pressure plate horizontally deployed in said spring brake housing between said main compression spring and said diaphragm and having a flat portion adjacent to said diaphragm, said pressure plate being associated with said actuator rod, wherein the side wall of said spring brake housing has a generally cylindrical shape, and said side wall has a nearly vertical orientation relative to said end wall and pressure plate wherein a compression spring is provided in said service brake housing acting on said push rod urging said push rod toward a retracted position, a second elastomeric diaphragm is suspended within said service brake housing and being sealingly attached to the edges thereof to form at least one chamber therein, a second large flat circular pressure plate is horizontally deployed in said service brake housing adjacent to said diaphragm, said second pressure plate being attached to said push rod, wherein the side wall of said service brake housing has a generally cylindrical shape, and said service brake side wall has a nearly vertical orientation relative to said second pressure plate.

19. The mechanism of claim 18 wherein the area of each of said pressure plates is maximized by reducing the gap between the outside circumferential edge of each such plate and the inside cylindrical side wall through which each such plate travels to a size that is between about 2¼ and about 4½ times the thickness of the diaphragm adjacent to such plate.

20. The mechanism of claim 18 wherein the area of each of said pressure plates is maximized by reducing the gap between the outside circumferential edge of each such plate and the inside cylindrical side wall through which each such plate travels to a size that is between about 2½ and about 4 times the thickness of the diaphragm adjacent to such plate.

21. The mechanism of claim 18 wherein the gap between the outside circumferential edge of each such plate and the inside of said cylindrical side wall through which each such plate travels is greater than about twice the thickness of the diaphragm adjacent to such plate and less than about 0.57 inches.

22. The mechanism of claim 18 wherein the gap between the outside circumferential edge of each such plate and the inside of said cylindrical side wall through which each such plate travels is greater than about twice the thickness of the diaphragm adjacent to such plate and less than about 0.5 inches.

23. The mechanism of claim 18 wherein the circumference of each plate is greater than about 2(R-4.56x) wherein x is the thickness of the diaphragm adjacent to such plate, R is the radius of the inside of said cylindrical side wall through which each such plate travels.

24. The mechanism of claim 18 wherein the circumference of each plate is greater than about 2(R-4.5x) wherein x is the thickness of the diaphragm adjacent to such plate, R is the radius of the inside of said cylindrical side wall through which each such plate travels.

25. The mechanism of claim 18 wherein the circumference of each plate is between about 2(R-4.56x) and about 2(R-2.25x) relative to the diaphragm adjacent to such plate and the housing wall through which such plate travels wherein x is the thickness of the diaphragm adjacent to such plate, R is the minimum radius of the inside of said cylindrical side wall through which each such plate travels.

26. The mechanism of claim 18 wherein the circumference of each plate is between about 2(R-4.5x) and about 2(R-2.5x) relative to the diaphragm adjacent to such plate and the housing wall through which such plate travels wherein x is the thickness of the diaphragm adjacent to such plate, R is the minimum radius of the inside of said cylindrical side wall through which each such plate travels.

27. The mechanism of claim 19 wherein the area of each of said pressure plates is further maximized by reducing the thickness of the diaphragm adjacent to such plate.

28. The mechanism of claim 27 wherein the diaphragm adjacent to each plate has a thickness of between 0.110 inches and 0.125 inches.

29. The mechanism of claim 20 wherein the area of each of said pressure plates is further maximized by reducing the thickness of the diaphragm adjacent to such plate.

30. The mechanism of claim 29 wherein the diaphragm adjacent to each plate has a thickness of between 0.110 inches and 0.125 inches.

31. The mechanism of claim 25 wherein the area of each of said pressure plates is further maximized by reducing the thickness of the diaphragm adjacent to such plate.

32. The mechanism of claim 31 wherein the diaphragm adjacent to each plate has a thickness of between 0.110 inches and 0.125 inches.

33. The mechanism of claim 26 wherein the area of each of said pressure plates is further maximized by reducing the thickness of the diaphragm adjacent to such plate.

34. The mechanism of claim 33 wherein the diaphragm adjacent to each plate has a thickness of between 0.110 inches and 0.125 inches.

35. A service brake assembly for providing increased force without increasing the maximum outside dimension of said assembly and without increasing the air pressure supplied to said assembly comprising a housing having end walls and a generally cylindrical side wall between said end walls, a brake actuating push rod having one end extending outwardly from said housing and another end disposed internally of said housing for reciprocating motion relative thereto, a compression spring provided in said housing acting on said push rod urging said push rod toward a retracted position, a cup-shaped single-piece elastomeric diaphragm suspended within said housing and being sealingly attached to said side wall to form at least one chamber therein, a generally flat circular pressure plate horizontally deployed in said housing adjacent to said diaphragm, said pressure plate having no peripheral guide and being attached to said push rod, wherein said side wall has a substantially vertical orientation relative to said pressure plate and said side wall has a generally consistent diameter in the region where the pressure plate moves, and wherein the outside circumferential edge of said pressure plate extends substantially to the inside edge of said cylindrical side wall leaving a narrow gap therebetween, and wherein the edges of said diaphragm attached to said side wall are capable of stretching substantially vertical when said diaphragm is fully expanded.

36. The mechanism of claim 35 wherein a diaphragm having a thin cross section is used.

37. The mechanism of claim 36 wherein the area of said pressure plate is maximized by reducing the gap between the outside circumferential edge of said circular pressure plate and the inside cylindrical side wall through which said plate travels to a size that is between about 2½ and about 4 times the thickness of the diaphragm adjacent to such plate.

38. The mechanism of claim 36 wherein the gap between the outside circumferential edge of said circular pressure plate and the inside of said cylindrical side wall through which said plate travels is greater than about twice the thickness of said diaphragm and less than about 0.57 inches.

39. The mechanism of claim 35 wherein the gap between the outside circumferential edge of said circular pressure plate and the inside of said cylindrical side wall through which said plate travels is greater than about twice the thickness of said diaphragm and less than about 0.5 inches.

40. The mechanism of claim 35 wherein the circumference of said plate is greater than about 2(R-4.56x) wherein x is the thickness of said diaphragm, R is the radius of the inside of said cylindrical side wall through which said plate travels.

41. The mechanism of claim 35 wherein the circumference of said plate is greater than about 2(R-4.5x) wherein x is the thickness of said diaphragm, R is the radius of the inside of said cylindrical side wall through which said plate travels.

42. The mechanism of claim 35 wherein the circumference of said plate is between about 2(R-4.56x) and about 2(R-2.25x) relative to said diaphragm and said housing wherein x is the thickness of said diaphragm, R is the minimum radius of the inside of said cylindrical side wall through which said plate travels.

43. The mechanism of claim 35 wherein the circumference of said plate is between about 2(R-4.5x) and about 2(R-2.5x) relative to said diaphragm and said housing wherein x is the thickness of said diaphragm, R is the minimum radius of the inside of said cylindrical side wall through which said plate travels.

44. The mechanism of claim 36 wherein the area of said pressure plate is further maximized by reducing the thickness of said diaphragm.

45. The mechanism of claim 44 wherein said diaphragm has a thickness of between 0.110 inches and 0.125 inches.

46. The mechanism of claim 37 wherein the area of said pressure plate is further maximized by reducing the thickness of said diaphragm.

47. The mechanism of claim 46 wherein said diaphragm has a thickness of between 0.110 inches and 0.125 inches.

48. The mechanism of claim 42 wherein the area of said pressure plate is further maximized by reducing the thickness of said diaphragm.

49. The mechanism of claim 48 wherein said diaphragm has a thickness of between 0.110 inches and 0.125 inches.

50. The mechanism of claim 43 wherein the area of said pressure plate is further maximized by reducing the thickness of said diaphragm.

51. The mechanism of claim 50 wherein said diaphragm has a thickness of between 0.110 inches and 0.125 inches.

52. An improvement to a spring brake assembly of the type having a housing having end walls, and a generally cylindrical side wall between said end walls, a brake actuating push rod having one end extending outwardly from said housing and another end disposed internally of said housing for reciprocating motion relative thereto, an elastomeric diaphragm suspended within said spring brake housing and being sealingly attached to said side wall to form at least one chamber therein a main compression spring disposed in said housing having one end engaging a generally horizontal end wall of said housing, a large circular pressure plate horizontally deployed in said housing between said main compression spring and said diaphragm and having a generally flat surface adjacent to said diaphragm, said pressure plate being associated with said push rod, the improvement comprising an apparatus for providing increased forced without increasing the maximum outside dimension of said assembly and without increasing the air pressure supplied to said assembly wherein said diaphragm is a single cup shaped piece, said pressure plate has no peripheral guide, and said side wall has a substantially vertical orientation relative to said pressure plate and said side wall has a generally consistent diameter in the region where the pressure plate moves, and wherein the outside circumferential edge of said pressure plate extends substantially to the inside edge of said cylindrical side wall leaving a narrow gap therebetween, and wherein the edges of said diaphragm attached to said side wall are capable of stretching substantially vertical when said diaphragm is fully expanded.

53. The mechanism of claim 52 wherein a diaphragm having a thin cross section is used.

54. The mechanism of claim 53 wherein the area of said pressure plate is maximized by reducing the gap between the outside circumferential edge of said circular pressure plate and the inside cylindrical side wall through which said plate travels to a size that is between about 2½ and about 4 times the thickness of the diaphragm adjacent to such plate.

55. The mechanism of claim 53 wherein the gap between the outside circumferential edge of said circular pressure plate and the inside of said cylindrical side wall through which said plate travels is greater than about twice the thickness of said diaphragm and less than about 0.57 inches.

56. The mechanism of claim 52 wherein the gap between the outside circumferential edge of said circular pressure plate and the inside of said cylindrical side wall through which said plate travels is greater than about twice the thickness of said diaphragm and less than about 0.5 inches.

57. The mechanism of claim 52 wherein the circumference of said plate is greater than about 2(R-4.56x) wherein x is the thickness of said diaphragm, R is the radius of the inside of said cylindrical side wall through which said plate travels.

58. The mechanism of claim 52 wherein the circumference of said plate is greater than about 2(R-4.5x) wherein x is the thickness of said diaphragm, R is the radius of the inside of said cylindrical side wall through which said plate travels.

59. The mechanism of claim 52 wherein the circumference of said plate is between about 2(R-4.56x) and about 2(R-2.25x) relative to said diaphragm and said housing wherein x is the thickness of said diaphragm, R is the minimum radius of the inside of said cylindrical side wall through which said plate travels.

60. The mechanism of claim 52 wherein the circumference of said plate is between about 2(R-4.5x) and about 2(R-2.5x) relative to said diaphragm and said housing wherein x is the thickness of said diaphragm, R is the minimum radius of the inside of said cylindrical side wall through which said plate travels.

61. The mechanism of claim 53 wherein the area of said pressure plate is further maximized by reducing the thickness of said diaphragm.

62. The mechanism of claim 61 wherein said diaphragm has a thickness of between 0.110 inches and 0.125 inches.

63. The mechanism of claim 54 wherein the area of said pressure plate is further maximized by reducing the thickness of said diaphragm.

64. The mechanism of claim 63 wherein said diaphragm has a thickness of between 0.110 inches and 0.125 inches.

65. The mechanism of claim 59 wherein the area of said pressure plate is further maximized by reducing the thickness of said diaphragm.

66. The mechanism of claim 65 wherein said diaphragm has a thickness of between 0.110 inches and 0.125 inches.

67. The mechanism of claim 60 wherein the area of said pressure plate is further maximized by reducing the thickness of said diaphragm.

68. The mechanism of claim 67 wherein said diaphragm has a thickness of between 0.110 inches and 0.125 inches.

69. A brake actuating unit for providing increased force without increasing the maximum outside dimension of said unit and without increasing the air pressure supplied to said unit comprising a housing with first and second end walls and a generally cylindrical side wall between said end walls, a cup shaped single-piece elastomeric diaphragm suspended within said housing and being sealingly attached to said side wall to form at least one chamber therein, a circular pressure plate horizontally deployed in said housing having a generally flat surface adjacent to said diaphragm, said pressure plate having no peripheral guide and being associated with a brake actuating rod disposed in said housing and extending through a centrally disposed opening in the first end wall for reciprocating movement relative to the housing, wherein said side wall has a substantially vertical orientation relative to said pressure plate and said side wall has a generally consistent diameter in the region where the pressure plate moves, and wherein the outside circumferential edge of said pressure plate extends substantially to the inside edge of said cylindrical side wall leaving a narrow gap therebetween, and wherein the edges of said diaphragm attached to said side wall are capable of stretching substantially vertical when said diaphragm is fully expanded.

70. The mechanism of claim 69 wherein a diaphragm having a thin cross section is used.

71. The mechanism of claim 70 wherein the area of said pressure plate is maximized by reducing the gap between the outside circumferential edge of said circular pressure plate and the inside cylindrical side wall through which said plate travels to a size that is between about 2½ and about 4 times the thickness of the diaphragm adjacent to such plate.

72. The mechanism of claim 70 wherein the gap between the outside circumferential edge of said circular pressure plate and the inside of said cylindrical side wall through which said plate travels is greater than about twice the thickness of said diaphragm and less than about 0.57 inches.

73. The mechanism of claim 69 wherein the gap between the outside circumferential edge of said circular pressure plate and the inside of said cylindrical side wall through which said plate travels is greater than about twice the thickness of said diaphragm and less than about 0.5 inches.

74. The mechanism of claim 69 wherein the circumference of said plate is greater than about 2(R-4.56x) wherein x is the thickness of said diaphragm, R is the radius of the inside of said cylindrical side wall through which said plate travels.

75. The mechanism of claim 69 wherein the circumference of said plate is greater than about 2(R-4.5x) wherein x is the thickness of said diaphragm, R is the radius of the inside of said cylindrical side wall through which said plate travels.

76. The mechanism of claim 69 wherein the circumference of said plate is between about 2(R-4.56x) and about 2(R-2.25x) relative to said diaphragm and said housing wherein x is the thickness of said diaphragm, R is the minimum radius of the inside of said cylindrical side wall through which said plate travels.

77. The mechanism of claim 69 wherein the circumference of said plate is between about 2(R-4.5x) and about 2(R-2.5x) relative to said diaphragm and said housing wherein x is the thickness of said diaphragm, R is the minimum radius of the inside of said cylindrical side wall through which said plate travels.

78. The mechanism of claim 70 wherein the area of said pressure plate is further maximized by reducing the thickness of said diaphragm.

79. The mechanism of claim 78 wherein said diaphragm has a thickness of between 0.110 inches and 0.125 inches.

80. The mechanism of claim 71 wherein the area of said pressure plate is further maximized by reducing the thickness of said diaphragm.

81. The mechanism of claim 80 wherein said diaphragm has a thickness of between 0.110 inches and 0.125 inches.

82. The mechanism of claim 76 wherein the area of said pressure plate is further maximized by reducing the thickness of said diaphragm.

83. The mechanism of claim 82 wherein said diaphragm has a thickness of between 0.110 inches and 0.125 inches.

84. The mechanism of claim 77 wherein the area of said pressure plate is further maximized by reducing the thickness of said diaphragm.

85. The mechanism of claim 84 wherein said diaphragm has a thickness of between 0.110 inches and 0.125 inches.

\* \* \* \* \*

UNITED STATES PATENT AND TRADEMARK OFFICE
CERTIFICATE OF CORRECTION

PATENT NO.    : 6,314,861 B1
DATED         : November 13, 2001
INVENTOR(S)   : Teddy D. Smith and Michael D. Stubblefield It is certified that error appears in the above-identified patent and that said Letters Patent is hereby corrected as shown below:

Column 4,
Line 16, replace "e.g" with -- e.g. --
Line 17, insert a space between "2¼" and "times"
Line 43, insert a space between "cylinder;" and "thus"

Column 5,
Line 38, replace "16" with -- 16, --
Line 56, replace "of" with -- off --

Column 6,
Line 64, delete ", generally 20,"

Column 8,
Line 66, replace "A=R$^2$" with -- A=$\pi$R$^2$ --
Lines 67-68, replace "=approximately" with -- $\pi$ = approximately --

Column 9,
Line 1, replace "A=¼D$^2$" with -- A=¼$\pi$D$^2$ --
Line 13, replace "(R-2.5x)$^2$" with -- $\pi$(R-2.5x)$^2$ --
Line 14, replace "(R4.56x)$^2$" with -- $\pi$(R-4.56x)$^2$ --
Line 18, replace "¼(D-5x)$^2$" with -- ¼$\pi$(D-5x)$^2$ --
Line 18, replace "¼(D-9.12x)$^2$" with -- ¼$\pi$(D-9.12x)$^2$ --
Line 25, replace "¼(7.375)$^2$" with -- ¼$\pi$(7.375)$^2$ --
Line 26, replace "1¼(6.86)$^2$" with -- ¼$\pi$(6.86)$^2$ --
Line 37, replace "(R'-25x)$^2$" with -- $\pi$(R'-25x)$^2$ --
Line 38, replace "(R'4.56x)$^2$" with -- $\pi$(R'4.56x)$^2$ --
Line 42, replace "¼(D'-5x)$^2$" with -- ¼$\pi$(D'-5x)$^2$ --
Line 42, replace "¼(D'-9.12x)$^2$" with -- ¼$\pi$(D'-9.12x)$^2$ --
Line 47, replace "2R" with -- 2$\pi$R --
Line 47, replace "2R'" with -- 2$\pi$R' --
Line 47, replace "D" with -- $\pi$D --
Line 47, replace "D" with -- $\pi$D --
Line 49, replace "2(R-2.5x)" with -- 2$\pi$(R-2.5x) --
Line 50, replace "2(R-4.56x)" with -- 2$\pi$(R-4.56x) --
Line 56, replace "2(R'-2.5x)" with -- 2$\pi$(R'-2.5x) --
Line 56, replace "2(R'-4.56x)" with -- 2$\pi$(R'-4.56x) --
Line 58, replace "(D-5x)" with -- $\pi$(D'-5x) --
Line 58, replace "(D-9.12x)" with -- $\pi$(D'-9.12x) --

UNITED STATES PATENT AND TRADEMARK OFFICE
CERTIFICATE OF CORRECTION

PATENT NO. : 6,314,861 B1
DATED : November 13, 2001
INVENTOR(S) : Teddy D. Smith and Michael D. Stubblefield It is certified that error appears in the above-identified patent and that said Letters Patent is hereby corrected as shown below:

Column 10,
Lines 52 and 60, replace "2(R-4.56x)" with -- $2\pi$(R-4.56x) --
Lines 56 and 66, replace "2(R-4.5x)" with -- $2\pi$(R-4.5x) --
Lines 60-61, replace "2(R-2.25x)" with -- $2\pi$(R-2.25x) --
Line 66, replace "2(R-2.5x)" with -- $2\pi$(R-2.5x) --

Column 12,
Lines 14 and 24, replace "2(R-4.56x)" with -- $2\pi$(R-4.56x) --
Lines 19, 31 and 32, replace "2(R-4.5x)" with -- $2\pi$(R-4.5x) --
Line 25, replace "2(R-2.25x)" with -- $2\pi$(R-2.25x) --

Column 13,
Lines 39 and 49, replace "2(R-4.56x)" with -- $2\pi$(R-4.56x) --
Lines 44 and 55, replace "2(R-4.5x)" with -- $2\pi$(R-4.5x) --
Line 50, replace "2(R-2.25x)" with -- $2\pi$(R-2.25x) --
Line 56, replace "2(R-2.5x)" with -- $2\pi$(R-2.5x) --

Column 14,
Line 59, replace "2(R-4.56x)" with -- $2\pi$(R-4.56x) --
Line 64, replace "2(R-4.5x)" with -- $2\pi$(R-4.5x) --

Column 15,
Line 2, replace "2(R-4.56x)" with -- $2\pi$(R-4.56x) --
Line 3, replace "2(R-2.25x)" with -- $2\pi$(R-2.25x) --
Line 8, replace "2(R-4.5x)" with -- $2\pi$(R-4.5x) --
Line 9, replace "2(R-2.5x)" with -- $2\pi$(R-2.5x) --

UNITED STATES PATENT AND TRADEMARK OFFICE
CERTIFICATE OF CORRECTION

PATENT NO.    : 6,314,861 B1
DATED         : November 13, 2001
INVENTOR(S)   : Teddy D. Smith and Michael D. Stubblefield It is certified that error appears in the above-identified patent and that said Letters Patent is hereby corrected as shown below:

Column 16,
Lines 17 and 27, replace "$2(R-4.56x)$" with -- $2\pi(R-4.56x)$ --
Lines 22 and 33, replace "$2(R-4.5x)$" with -- $2\pi(R-4.5x)$ --
Line 28, replace "$2(R-2.25x)$" with -- $2\pi(R-2.25x)$ --
Line 34, replace "$2(R-2.5x)$" with -- $2\pi(R-2.5x)$ --

Signed and Sealed this

Third Day of December, 2002

JAMES E. ROGAN
*Director of the United States Patent and Trademark Office*